United States Patent [19]

Landis

[11] 3,712,210

[45] Jan. 23, 1973

[54] COLOR BAR PRINTER

[75] Inventor: Donald E. Landis, Cambridge, Ohio

[73] Assignee: The National Cash Register Company, Dayton, Ohio

[22] Filed: June 30, 1970

[21] Appl. No.: 51,073

[52] U.S. Cl. .................. 101/93 C, 101/102, 101/198, 101/332

[51] Int. Cl. ............ B41f 1/44, B41j 5/44, B41j 33/00

[58] Field of Search ........ 101/93, 332, 193, 196, 198, 101/336, 288, 292, 102; 197/1; 235/61.9, 61.11 E, 61.11 F; 340/146.3 K

[56] References Cited

UNITED STATES PATENTS

| | | | |
|---|---|---|---|
| 3,340,983 | 9/1967 | Halverson | 197/1 R |
| 3,481,446 | 12/1969 | Burkhardt et al. | 101/102 |
| 3,304,856 | 2/1967 | Birch | 101/336 X |
| 3,584,779 | 6/1971 | Kessler et al. | 235/61.11 E |
| 3,194,154 | 7/1965 | McKeag | 101/288 |
| 3,576,428 | 4/1971 | Kapsambelis | 235/61.11 E |
| 3,537,392 | 11/1970 | Ikuss | 101/198 |
| 3,253,543 | 5/1966 | Lippard | 101/426 |
| 3,340,984 | 9/1967 | Smith | 197/1 R |
| 3,486,006 | 12/1969 | Siegel | 235/61.11 E |

*Primary Examiner*—J. Reed Fisher
*Attorney*—Louis A. Kline, John J. Callahan and Harry W. Barron

[57] ABSTRACT

A printer, which includes a pair of green printing elements and a pair of black printing elements, causes a sequence of green, black, and white colored bars to exist on a tag, where the green and black bars are printed and the white bars are the tag color resulting from a lack of printing. The tag is moved through the printer in discrete steps of two bar widths at a time, so that two new areas of the tag are beneath each pair of printing elements after each discrete movement. Signals are then applied to those printing elements which are then to print bars. A ribbon, which is associated with each pair of printing elements, is moved one bar width each time a print signal is applied to the pair of printing elements. This movement occurs after the leading one of the printing elements prints and before the trailing one of the printing elements prints. Logic circuitry is also included for converting a binary code into signals representing the colored bar code and for providing necessary signals to the printing elements and the ribbons. The code-converting circuitry uses a module three up-down counter, and the then existing count in the counter represents the then required color bar.

23 Claims, 7 Drawing Figures

FIG. 1
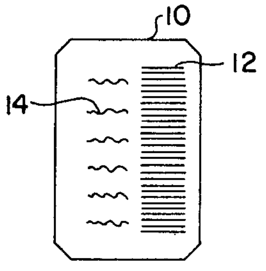
PRIOR ART
FIG. 2
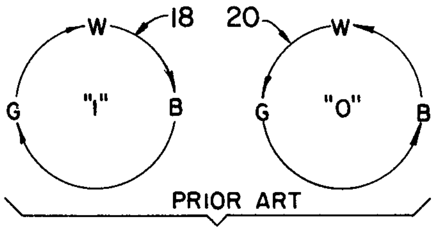
FIG. 3
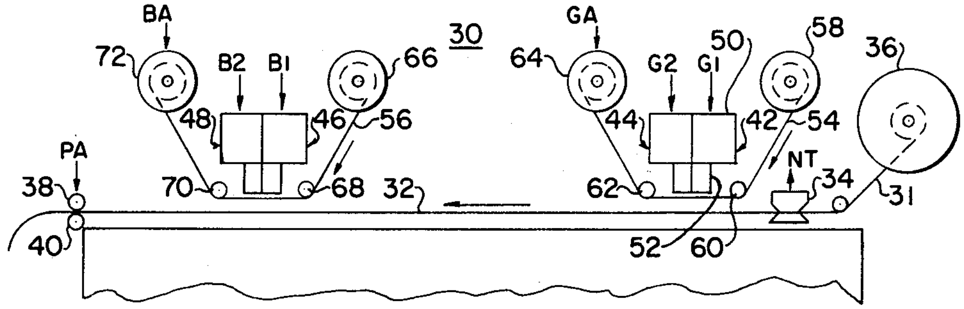
FIG. 5
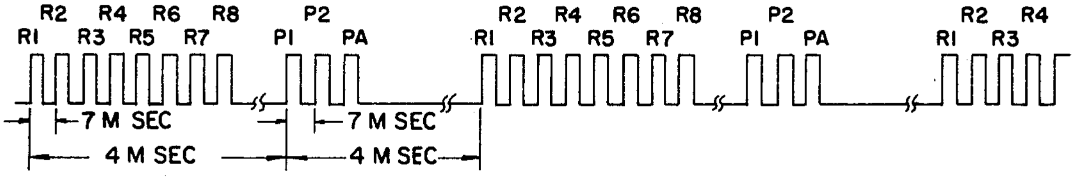
FIG. 6
| BAR # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| BAR | G | B | W | G | B | G | W | B | W | G | W | B | W | B | G | W | B | G | B | G | W | B | W | G | B | G | B |
| BIT # | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | |
| BIT | 0 | 0 | 0 | 0 | 1 | 1 | 1 | 0 | 0 | 1 | 1 | 0 | 1 | 1 | 1 | 1 | 1 | 0 | 1 | 1 | 1 | 0 | 0 | 0 | 1 | 0 | |
INVENTOR
DONALD E. LANDIS
BY Louis A Kline
John J. Callahan
Harry W Barron
HIS ATTORNEYS

INVENTOR
DONALD E. LANDIS

BY Louis A. Kline
John J. Callahan
Harry W. Barron
HIS ATTORNEYS

FIG. 7

| BAR # | BIT # | TIME | M3 | MR | G1 | G2 | 108 | GA | B DATA |
|---|---|---|---|---|---|---|---|---|---|
| | | 0 | 2 | 0 | | | 0 | | |
| | | P1 | 2 | 0 | | | 0 | | |
| 1 | | P2 | 2 | 0 | X | | 1 | | |
| | 1 | R2 | 1 | 0 | | | 1 | | |
| | | R3 | 1 | 1 | | | 1 | | |
| | | R4 | 1 | 1 | | | 1 | | 1 |
| | 2 | R5 | 0 | 1 | | | 1 | | |
| | | R6 | 0 | 1 | | | 1 | | 0 |
| | | R8 | 0 | 1 | | | 1 | X | |
| | | P1 | 0 | 1 | | | 0 | | |
| | | P2 | 0 | 1 | – | – | 0 | | |
| | 3 | R2 | 2 | 1 | | | 0 | | |
| | | R3 | 2 | 2 | | | 0 | | |
| | | R4 | 2 | 2 | | | 0 | | 0 |
| | 4 | R5 | 1 | 2 | | | 0 | | |
| | | R6 | 1 | 2 | | | 0 | | 1 |
| | | R8 | 1 | 2 | | | 0 | X | |
| | | P1 | 1 | 2 | | | 0 | | |
| 4 | | P2 | 1 | 2 | | X | 0 | | |
| | 5 | R2 | 2 | 2 | | | 0 | | |
| | | R3 | 2 | 2 | | | 0 | | |
| | | R4 | 2 | 2 | | | 0 | | 0 |
| | 6 | R5 | 0 | 2 | | | 0 | | |
| | | R6 | 0 | 2 | | | 0 | | 0 |
| | | R8 | 0 | 2 | | | 0 | X | |
| | | P1 | 0 | 2 | | | 0 | | |
| 6 | | P2 | 0 | 2 | | X | 0 | | |
| | 7 | R2 | 1 | 2 | | | 0 | | |
| | | R3 | 1 | 1 | | | 0 | | |
| | | R4 | 1 | 1 | | | 0 | | 1 |
| | 8 | R5 | 0 | 1 | | | 0 | | |
| | | R6 | 0 | 1 | | | 0 | | 0 |
| | | R8 | 0 | 1 | | | 0 | – | |
| | | P1 | 0 | 1 | | | 0 | | |
| | | P2 | 0 | 1 | – | – | 0 | | |
| | 9 | R2 | 2 | 1 | | | 0 | | |
| | | R3 | 2 | 2 | | | 0 | | |
| | | R4 | 2 | 2 | | | 0 | | 0 |

| BAR # | BIT # | TIME | M3 | MR | G1 | G2 | 108 | GA | B DATA | 20 | 21 | B1 | B2 | 128 | BA |
|---|---|---|---|---|---|---|---|---|---|---|---|---|---|---|---|
| | 19 | R2 | 2 | 2 | | | 0 | | | – | – | | | 0 | |
| | | R3 | 2 | 2 | | | 0 | | | – | – | | | 0 | |
| | | R4 | 2 | 2 | | | 0 | | 0 | – | – | | | 0 | |
| | 20 | R5 | 0 | 2 | | | 0 | | | – | – | | | 0 | |
| | | R6 | 0 | 2 | | | 0 | | 0 | – | – | | | 0 | |
| | | R7 | 0 | 2 | | | 0 | | | 1 | – | | | 0 | |
| | | R8 | 0 | 2 | | | 0 | X | | 1 | – | | | 0 | – |
| | | P1 | 0 | 2 | | | 0 | | | 1 | – | | | 0 | |
| 20/2 | | P2 | 0 | 2 | | X | 0 | | | 1 | – | X | | 1 | |
| | 21 | R2 | 1 | 2 | | | 0 | | | 1 | – | | | 1 | |
| | | R3 | 1 | 1 | | | 0 | | | 1 | – | | | 1 | |
| | | R4 | 1 | 1 | | | 0 | | 1 | 1 | – | | | 1 | |
| | 22 | R5 | 0 | 1 | | | 0 | | | 0 | 1 | | | 1 | |
| | | R6 | 0 | 1 | | | 0 | | 0 | 0 | 1 | | | 1 | |
| | | R7 | 0 | 1 | | | 0 | | | 0 | 0 | | | 1 | |
| | | R8 | 0 | 1 | | | 0 | – | | 0 | 0 | | | 1 | X |
| | | P1 | 0 | 1 | | | 0 | | | 0 | 0 | | | 0 | |
| | | P2 | 0 | 1 | – | – | 0 | | | 0 | 0 | – | – | 0 | |
| | 23 | R2 | 2 | 1 | | | 0 | | | 0 | 0 | | | 0 | |
| | | R3 | 2 | 2 | | | 0 | | | 0 | 0 | | | 0 | |
| | | R4 | 2 | 2 | | | 0 | | 0 | 0 | 0 | | | 0 | |
| | 24 | R5 | 1 | 2 | | | 0 | | | 1 | 0 | | | 0 | |
| | | R6 | 1 | 2 | | | 0 | | 1 | 1 | 0 | | | 0 | |
| | | R7 | 1 | 2 | | | 0 | | | 0 | 1 | | | 0 | |
| | | R8 | 1 | 2 | | | 0 | X | | 0 | 1 | | | 0 | X |
| | | P1 | 1 | 2 | | | 0 | | | 0 | 1 | | | 0 | |
| 24/5 | | P2 | 1 | 2 | | X | 0 | | | 0 | 1 | | X | 0 | |
| | 25 | R2 | 2 | 2 | | | 0 | | | 0 | 1 | | | 0 | |
| | | R3 | 2 | 2 | | | 0 | | | 0 | 1 | | | 0 | |
| | | R4 | 2 | 2 | | | 0 | | 0 | 0 | 1 | | | 0 | |
| | 26 | R5 | 1 | 2 | | | 0 | | | 0 | 0 | | | 0 | |
| | | R6 | 1 | 2 | | | 0 | | 1 | 0 | 0 | | | 0 | |
| | | R7 | 1 | 2 | | | 0 | | | 1 | 0 | | | 0 | |
| | | R8 | 1 | 2 | | | 0 | X | | 1 | 0 | | | 0 | – |
| | | P1 | 1 | 2 | | | 0 | | | 1 | 0 | | | 0 | |
| 26/8 | | P2 | 1 | 2 | | X | 0 | | | 1 | 0 | X | | 1 | |
| | | R5 | – | – | | | 0 | | | 0 | 1 | | | 1 | |
| | | R7 | – | – | | | 0 | | | 0 | 0 | | | 1 | |
| | | R8 | – | – | | | 0 | – | | 0 | 0 | | | 1 | X |

INVENTOR
DONALD E. LANDIS

BY Louis A. Kline
John J. Callahan
Harry W. Barron
HIS ATTORNEYS

COLOR BAR PRINTER

This invention relates to a printing system and more particularly to a system for printing a plurality of colored bars in a predetermined sequential order so as to form a desired binary code.

U.S. Pat. application, Ser. No. 837,850, filed June 30, 1969, now U.S. Pat. No. 3,671,722, in the name of John B. Christie, Inventor, and entitled "Transition Code Recognition System," teaches that it is possible to have printed on a surface, such as a price tag, a series of adjacent colored bars of three or more colors which represent a series of binary digits. These binary digits represent certain information, such as the price of an article being sold by a commercial business, the department and the store from which it came, and possibly a number specific to that article. The series of binary digits further include certain digits used for checking and for parity.

U.S. Pat. application, Ser. No. 837,514, filed June 30, 1969, now U.S. Pat. No. 3,637,993, in the names of John B. Christie, Dzintars Abuls, and Wilfridus G. van Breukelen, Inventors, and entitled "Transition Code Recognition System," shows a system for reading the colored bars on these tags so as to obtain the desired binary information therefrom. Briefly, that system merely requires a store clerk to take an optical probe scanner, which may resemble a pencil, and guide it across the colored bars. By doing this, all of the information recorded on the tag is entered into a terminal, such as a cash register. That type of system greatly reduces errors resulting from manual insertion of the information into the terminal, as well as increasing the speed at which an entry is made.

In the use of a system as described above, it is necessary to provide a tag for each item of merchandise. In many instances, there will be many identical items which all use identical tags. It therefore becomes necessary to have a printer capable of printing many identical tags. One such printer is described in U.S. Pat. application, Ser. No. 51,149, filed June 30, 1970 in the name of Richard E. Graham, Inventor, and entitled "-Control Means for an Optical Bar Code Serial Printer." That printer can print a tag having green, black, and white bars, where the green and black bars are printed on the tag and the white bars are the background color of the tag. The green and black bars are printed by providing the printer with a single green print hammer and a single black print hammer, which is separated from the green hammer, and by moving the tag past these hammers in discrete steps of one bar width. As an area of the tag designated to have a green bar thereon moves under the green hammer, the green hammer is caused to print the green bar by striking a green ribbon positioned between the green hammer and the tag. Similar events occur when an area designated to have a black ribbon thereon moves under the black hammer.

The major problem with that type of printer is the speed at which the tags are printed. That speed is limited by the amount of time necessary for the hammer to print the bar.

In accordance with one embodiment of the present invention, a printer is provided which is responsive to a given digital code. The printer prints a given symbol in selected nonadjacent areas of a movable surface. The surface is divided into a plurality of adjacent areas, each of which has a given dimension taken along a path parallel to the direction in which the surface moves. The printer comprises first and second print heads, which are so positioned with respect to the surface that, upon the occurrence of a print signal, each of the print heads is associated with one of two adjacent areas on the surface. Each of these print heads is capable of causing said given symbol to be printed in the area with which it is then associated. There is also provided surface-moving means for causing the surface to move a distance equal to an even-number multiple of the given distance between the time each of the print signals occurs. There is further provided logic means which is responsive to signals representative of the digital code for causing the print signals to be applied to the print heads in such a manner that, whenever a selected area is associated with the first print head, a print signal is applied thereto to cause the first print head to cause the symbol to be printed in the selected area, and, whenever a selected area is associated with the second print head, the print signal is applied thereto to cause the second print head to cause the symbol to be printed in that selected area.

A more complete description of the invention and its mode of operation is given hereinafter with reference being made to the following-described FIGURES, in which:

FIG. 1 shows a prior-art tag with the color bars printed thereon;

FIG. 2 shows two diagrams useful in translating the color bar code:

FIG. 3 shows a diagram of the printing system;

FIG. 5 shows a timing diagram useful in the understanding of the operation of FIG. 4;

FIG. 6 shows a chart giving an arbitrary color code and the binary code associated therewith; and FIG. 7 shows a chart useful in understanding the operation of FIG. 4 when processing the code shown in FIG. 4.

Figure 4:
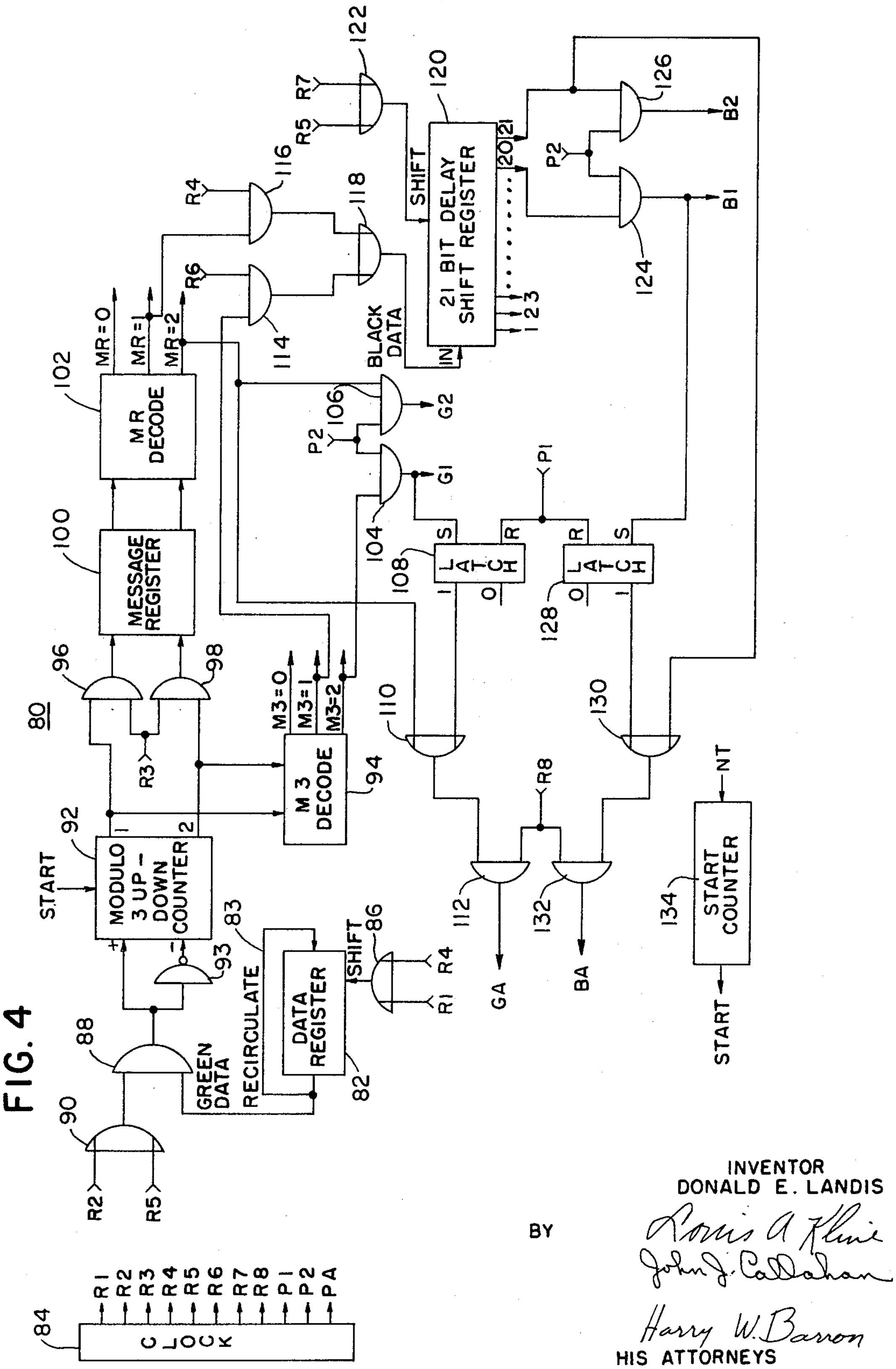
FIG. 4 shows a logic diagram necessary for controlling the system shown in FIG. 3.

Referring now to FIG. 1, a modern-day price tag 10 is shown. The right-hand side of the tag 10 includes a series of colored bars 12, and the left-hand side of the tag 10 includes a series of alpha-numeric characters 14. Such a tag could be affixed to any article of merchandise in a store, such as an article of clothing in a department store, a can of food goods in a grocery store, a screwdriver in a hardware store, and so forth. Rather than having the clerk at a cash register look at the tag and determine the price, the department number, and any other information desired to be entered into the cash register for future uses in inventory and accounting control, it is merely necessary to scan the sequence of colored bars 12 with a probe, as explained in the above-noted U.S. patent applications. This automatically inserts the desired information into the register. The alpha-numeric characters 14 enable the customer to know the price. There would also be included in the characters 14 the same information included in the colored bars 12, if for one reason or another the scanning equipment was inoperative.

Before a description of the printer becomes meaningful, it is first necessary to understand the color bar code. In this code, each transition from one color to another color represents a binary bit (either a "1" or a "0"). Thus, there need be no instance where two bars of the same color are printed adjacent to one another. FIG. 2 shows two charts 18 and 20, which allow one to convert a sequence of white, black, and green color bars, represented by the respective letters W, B, and G, into the binary code which they represent, or, conversely, to convert a given binary code into a sequence of white, black, and green color bars. As seen from the chart 18, a "1" bit may be represented by the transitions from a green bar to a white bar, from a white bar to a black bar, or from a black bar to a green bar. Similarly, as seen from the chart 20, a "0" bit is represented by the transitions from a white bar to a green bar, a green bar to a black bar, or a black bar to a white bar. Thus, once the binary code to be placed on a tag 10 is determined, the charts 18 and 20 may be used to determine what sequence of color bars should be placed on the tag.

In order to allow the probe to be scanned across the color bars in either direction, the first bar will always be green, and the last bar will always be black. To insure that the last bar is black, a pair of parity bars are included in the sequence. In this manner, when the probe goes from the white background of the tag to the green bar, a "0" bit will be detected. This will tell the logic circuitry associated with the reader that the scan is being made in one direction. However, if the scan were in the other direction, the transition would be from the white background of the tag to a black bar, which would represent a "1" bit. The logic circuitry associated with the reader would know from this that the direction of the scan was in the other direction, and appropriate action could be taken to insure a proper reading.

The sequence of bars 12 may be made in several fashions. One manner is to provide four binary bits for each numerical character required on the sequence of bars. For instance, if one wished to represent the number 380, one could provide twelve bars, the first four of which represented the number 3, the next four the number 8, and the last four the number 0. Further, two parity bars would be included, to insure that the last bar is black, and several other bars, for insuring that the proper code has been detected.

Referring now to FIG. 3, a system 30 for printing the sequence of colored bars 12 on a given tag 10 is shown. It should be understood that the printing system 30 is not drawn to any particular scale and in actual practice would probably look quite different from the diagram shown. However, for reasons of clarity, the system 30 is drawn as shown.

The system 30 includes a continuous strip of paper 31, which is a series of tags, such as the tag 32, on which the color bars are printed. There are equally spaced indentations along the paper 31, which represent the point at which one tag ends and a new one begins. In response to these indentations, a new tag detector 34 can detect when a new tag is approaching the print area. When each new tag is detected, an NT signal is provided by the new tag detector 34. The series of tags 31 are wound around a supply reel 36 and are moved a given distance each time a signal PA is applied to a pair of indexing drive mechanisms 38 and 40.

The system 30 further includes a pair of green print heads 42 and 44 and a pair of black print heads 46 and 48. Each of the print heads includes a driver means and a printing hammer, such as the driver means 50 and the printing hammer 52 of the print head 42. The driving means may include an oscillating ram and an interposer, as shown in U.S. Pat. No. 3,394,882, issued July 30, 1968, on the application of Joseph F. Cattorini et al. and entitled "Card Punch Mechanism." Whenever a signal G1 is applied to the drive means 50, the printing hammer 52 moves downwardly. The print heads 44, 46, and 48 are responsive to respective signals G2, B1, and B2 in a manner similar to the manner in which the print head 42 is responsive to the signal G1.

There are also provided in the system 30 a green ribbon 54 and a black ribbon 56. The green ribbon 54 is stored on a green ribbon supply reel 58 and is fed between the print heads 42 and 44 and the tag 32 via rollers 60 and 62 to a green ribbon take-up reel 64. The ribbon is moved a given distance on the occurrence of each signal GA which may be applied to a mechanism such as a stepping motor associated with the reel 64. Similarly, the black ribbon 56 is fed from a black ribbon supply reel 66 around rollers 68 and 70 to a black ribbon take-up reel 72, so that the black ribbon 56 is positioned between the print heads 46 and 48 and the tag 32. The take-up reel 72 is associated with mechanisms, such as a stepping motor, which on the occurrence of each BA signal causes the ribbon 56 to move a given distance.

In the system 30, the green print heads 42 and 44 are adjacent to one another; that is, if both print heads 42 and 44 caused green bars to be printed simultaneously, these bars would appear adjacent to one another on the tag 32. However, since the color bar code is a transition code, it is unnecessary for the printing heads 42 and 44 to print simultaneously, and, in the system 30 arrangement, this does not happen. Similarly, the black printing heads 46 and 48 are adjacent to one another, but only one of the print heads 46 or 48 can print a black bar at one time. The print heads 42 and 46 and the print heads 44 and 48 are each separated by a certain number of bar widths which is determined by the size of the mechanical apparatus used in the printing apparatus; in the system 30, this separation is nineteen bar widths.

The tag 32 is moved toward the left in FIG. 3 a distance equal to two bar widths upon the occurrence of each PA signal. The PA signal is a periodic pulse signal which is described in more detail hereinafter. Between each of the PA signals, one of the G1 and G2 signals may occur and one of the B1 and B2 signals may occur, all four of which are described in more detail hereinafter. Whenever one of these signals occurs, the particular print head with which they are associated causes a bar to be printed on the tag 32 by causing the printing hammer to move downwardly. This causes the ribbon to come into contact with the tag 32, resulting in ink from the ribbon remaining on the tag 32.

Hereinafter, the sequence of colored bars will be referred to as the first bar, the second bar, and so forth, and will be printed in the first space on the tag, the second space on the tag, and so forth. Further, the junction between the first and second bars represents the first bit, between the second and third bars represents the second bit, and so forth, until the junction between the next-to-last bar and the last bar represents the last bit.

Since the first bar is always green, the first space on the tag 32 will be moved until it is beneath either print head 42 or 44; in the system 30, the tag is moved until the first space is under the print head 42. This, in turn, requires that a certain number of PA signals occur after the NT signal occurs and before the first G1 signal occurs. This certain number is determined by the separation between the print head 42 and the new tag detector 34 and the number of white spaces preceding the first bar. After the first space is beneath the print head 42, a G1 signal occurs, resulting in the driver means 50 causing the printing hammer 52 to move downwardly, thereby causing the first bar to be printed in the first space. Thereafter, the signal GA occurs, and the ribbon 54 is advanced to the left an amount equal to one bar width, so that good (or unused) ribbon is under the printing hammer 52 of the print head 42, and bad (or used) ribbon is under the printing hammer of the print head 44. Thereafter, another PA signal occurs, and the tag 32 moves to the left two spaces, so that space two is beneath the print head 44 and space three is beneath the print head 42. If it be assumed that no green bars are to be printed in spaces two and three, nothing happens until after the next PA signal occurs and causes spaces four and five to be respectively beneath the print heads 44 and 42. If it be now assumed that a green bar is to be printed in space four, a GA signal occurs, followed by a G2 signal. The GA signal moves the ribbon one bar width, so that good ribbon is under both print heads 42 and 44, and the G2 signal causes a bar to be printed by the print head 44 in space four. After this occurs, bad ribbon is again under the print head 44, and good ribbon is under the print head 42.

The procedure of moving the ribbon 54 after each time the print head 42 prints and before each time the print head 44 prints makes maximum use of the ribbon 54, since there is always bad ribbon just ahead of the ribbon that is used for a printing operation.

The procedure of moving the tag 32 two bar widths and printing with only one of the printing elements, if necessary, continues as long as tags are to be printed. Thus, whenever a green bar is to be printed in an even-number space, the print head 44 does the printing, and, whenever a green bar is to be printed in an odd-number space, the print head 42 does the printing. Further, after each PA signal occurs, the tag 32 moves and comes to rest, so that a lower-numbered even space is beneath the print head 44 and a higher-numbered odd space is beneath the print head 42; for example, space two was beneath the print head 44, and space three was beneath the print head 42, as explained above.

After the tenth PA signal following the printing of a green bar in space one, space one will be beneath the black print head 48, space two beneath the black print head 46, space twenty beneath the green print head 44, and space twenty-one beneath the green print head 42. If, in this instance, it is desired to have a black bar in space two and a green bar in space twenty, it is first necessary to provide the GA signal, then the G2 and B1 signals, and finally the BA signal. More specifically, one would first move the green ribbon 54 one bar width in anticipation of causing the print head 44 to print a bar in space twenty. Then the signals G2 and B1 would be provided to cause the print heads 44 and 46 to respectively print a green bar in space twenty and a black bar in space two. Thereafter, the black ribbon 56 would be advanced one bar width, and the tag 32 would be moved two bar widths.

With regard to the black print heads 46 and 48, it should be noted that the print head 46 prints black bars in even-numbered spaces, and the print head 48 prints black bars in odd-numbered spaces. Further, when the tag 32 is at rest, the lower number odd numbered bar is beneath the print head 48, and the higher numbered even number is beneath the print head 46; for example, space one was beneath the print head 48, and space two was beneath the print head 46, as explained above.

Referring now to FIG. 4, there is shown logic circuitry 80, which is associated with the system 30 to enable the proper BA and GA, B1, B2, G1, G2 and PA signals to be applied at the proper time to achieve the above-described operation. The logic circuitry 80 includes a data register 82, in which the desired binary data is stored. This data may come from a keyboard (not shown) associated with the printer 30 and from certain other logic circuits (not shown) which cause certain check and parity bars to be included in the sequence of bars. A more detailed description of logic circuitry for obtaining the binary information which is to be stored in the data register 82 is given in the above-noted Graham U.S. patent application. For the purposes of this invention, however, it will be assumed that the proper data has been stored in the data register 82. The data register 82 is provided with a recirculating line 83, so that data read out is inserted back into the register 82. This allows many identical tags to be printed.

There is also provided in the data register 80 a clock 84, which provides eleven separate signals R1, R2, R3, R4, R5, R6, R7, R8, P1, P2, and PA. FIG. 5 shows a graph of the occurrence of each of the signals provided by the clock 84. It is seen that each of the R1–R8 signals occurs one after another, have leading edges separated by seven microseconds, and are 3.5-microsecond pulses. Further, the leading edges of the R1 and the P1 signals are separated by 4 milliseconds, and thus the leading edge of each R1 signal is separated by eight milliseconds. The P1, P2, and PA signals are also 3.5-microsecond pulses and are separated by 7 microseconds. Thus, the clock 84 will provide a sequence of the eight R1-R8 pulses, then a period of time in which no pulses occur, a sequence of the three P1, P2, and PA pulses, a period of time in which no pulses occur, another sequence of R pulses, a period of no pulses, a sequence of P pulses, and so forth.

Referring again to FIG. 4, the data in the data register 82 is shifted to the left upon the occurrence of each R1 and R4 pulse from the clock 84. This results by having the "shift" input of the data register 82 connected to the output of an OR gate 86, which has two inputs that are connected, respectively, to the R1 and the R4 pulses. The serial output of the data register 82 is connected to one input of an AND GATE 88. The second input of the AND gate 88 is connected to the output of an OR gate 90, which has two inputs connected, respectively, to the R2 and R5 pulse signals from the clock 84.

The output of the AND gate 88 is connected to the "up" input of a two-stage modulo 3 UP-DOWN counter 92 and through an inverter 93 to the "down" input of the modulo 3 UP-DOWN counter 92. The counter 92 is a two-stage counter which is responsive to the bit appearing at the output of the AND gate 88 in such a manner that, whenever a "1" bit appears at the output of the AND gate 88, the count in the counter 92 increases by "one," and, whenever a "0" bit appears at the output of the AND gate 88, the count in the counter 92 decreases by "one." A modulo 3 counter is a two-stage counter only having three possible states, and, in the case of the counter 92, these states are "0—0," "0–1," or "1–0," where the first number represents the state of the second stage and the second number represents the state of the first stage. When the counter 92 is in the "1–0" state, and a "1" bit appears at the output of the AND gate 88, it will go to the "0—0" state. Similarly, if it is in the "0—0" state, and a "0" bit appears at the output of the AND gate 88, the counter 92 will go to the "1–0" state. Hereinafter, for convenience, it will be assumed that the counts possible in the counter 92 will be "0", "1," and "2."

The outputs of each of the two stages of the counter 92 are applied to an M3 decode circuit 94, which provides signals indicative of the particular count in the counter 92. The M3 decode circuit 94 has three outputs, which are the M3=0 output, the M3=1 output, and the M3=2 output. Two of these outputs will be low; one of these outputs will be high; and the one high output will be the one corresponding to the then existing count in the counter 92. The outputs of the counter 92 are also applied to one respective input of each of AND gates 96 and 98. The other inputs of the AND gates 96 and 98 are coupled to the R3 clock signal from the clock 84.

The respective outputs of the AND gates 96 and 98 are coupled to a pair of respective flip-flops in a message register 100, and the outputs of these flip-flops of the message register 100 are connected to an MR decode circuit 102. The MR decode circuit 102 has three outputs, which are the MR=0, MR=1, and MR=2 outputs, and is similar to the M3 decode circuit 94, with the exception that it decodes the particular count in the message register 100 rather than in the Module 3 counter 92. The action of the AND gates 96 and 98 and the message register 100 causes the count existing in the Module 3 counter 92 at time R3 to be locked in the message register 100 and thus appear at the proper output of the MR decode circuit 102. In this manner, the message register 100 serves as a memory for the count in the counter 92 as it existed at time R3.

The M3=2 output of the M3 decode circuit 94 is coupled to one input of an AND gate 104, and the MR=2 output of the MR decode circuit 102 is coupled to one input of an AND gate 106. The other inputs of the AND gates 104 and 106 are coupled to the P2 signal from the clock 84. The output of the AND gate 104 is the G1 signal, which is applied to the print head 42 in FIG. 3, and the output of the AND gate 106 is the G2 signal, which is applied to the print head 44 in FIG. 3. The output of the AND gate 104 is also applied to the set(S) input of a latch circuit 108. The latch circuit 108 may be a flip-flop or a pair of cross-coupled NAND gates. The "1" output of the latch circuit 108 is coupled to one input of an OR gate 110. The other input of the OR gate 110 is coupled to the MR=2 output of the MR decode circuit 102. The output of the OR gate 110 is coupled to one input of an AND gate 112.

The M3=1 output of the M3 decode circuit 94 is coupled to one input of an AND gate 114, and the MR=1 output of the MR decode circuit 102 is coupled to one input of an AND gate 116. The other input of the AND gate 114 is coupled to the R6 signal, and the other input to the AND gate 116 is coupled to the R4 signal. The outputs of each of the AND gates 114 and 116 are coupled to the respective inputs of an OR gate 118, the output of which represents the black data signal. The output of the OR gate 118 is connected to a serial input of a twenty-one-bit delay shift register 120. The "shift" input of the shift register 120 is connected to the output of an OR gate 122, which has the R5 and R7 signals applied to its respective two inputs.

The shift register 120 will cause the bits in each of its 21 stages to be shifted one stage up upon the occurrence of each R5 or R7 pulse. The output of the twentieth stage of the shift register 120 is connected to one input of an AND gate 124, and the output of the 21st stage of the shift register 120 is connected to one input of an AND gate 126. The other inputs of each of the AND gates 124 and 126 are connected to the P2 signal from the clock 84. The output of the AND gate 124 is the B1 signal, which is applied to the print head 46 in FIG. 3, and the output of the AND gate 126 is the B2 signal, which is applied to the print head 48 in FIG. 3. The output of the AND gate 124 is coupled to the set(S) input of a latch circuit 128, which is similar to the latch circuit 108. The reset (R) inputs of each of the latch circuits 108 and 128 are connected to the P1 signal from the clock 84. The "1" output of the latch circuit 128 is connected to one input of an OR gate 130. The other input of the OR gate 130 is connected to the 21st output of the shift register 120. The output of the OR gate 130 is connected to one input of an AND gate 132. The second input of the AND gates 112 and 132 is connected to the R8 signal from the clock 84, and the output of the AND gates 112 and 132 are, respectively, the GA and BA signals, which are applied to the respective ribbon take-up reels 64 and 72 in FIG. 3.

Referring again to FIG. 3, the new tag detector 34 provides a signal NT each time it detects a new tag. This signal is applied to a start counter circuit 134 in FIg. 4, which causes a START signal to be provided. This START signal is applied to the modulo 3 counter 92 to set it to an initial count of two, and prevents colored bars from being printed on the tag 32 until the first space thereof is beneath the print head 42.

Referring now to FIG. 6, an arbitrary sequence of color bars is assumed, which are seen in the row labeled BAR, where G represents a green bar, B represents a black bar, and W represents a white bar. The row labeled BIT is the binary code which is represented by this sequence of color bars. For convenience, each bar has been labeled and given a numerical number from 1 through 27 in the row labeled BAR No., and each bit has been given a numerical designation from 1 through 26 in the row labeled BIT No. The reason there is one more bar than there are bits is that the first bar must be a green bar and does not give any significant digital information in the transition on the white background of the tag to the green bar preceding the sequence of bars. Thus, according to the diagrams shown in FIG. 2, the first bit will be a "0" bit because the transition from bar 1 to bar 2 is green to black.

The operation of the logic circuitry 80 will now be explained in connection with FIG. 7, in which a chart showing the values of various signals at different times is shown. When the new tag detector 34 detects a new tag, the NT signal is applied to the start counter circuit 134, which provides the START signal. The START signal first sets the modulo 3 counter 92 to a count of "2" and inhibits printing on the tag until the first space thereof is in the proper position beneath the print heads 42. After the tag has reached the proper position, the clock 84 will provide a P1, P2, and PA pulse. The P1 pulse causes the latch circuits 108 and 128 to become reset if they are not already so reset. The P2 pulse causes a signal to be applied at the output of the AND gate 104 because the counter 92 has a count of "2" therein, thereby causing an M3=2 high signal to appear at the output of the M3 decode circuit 94. This is the G1 signal and is applied to the print head 42 to cause a first green bar to be printed on the tag 32 in its first space. Referring to FIG. 7, it is seen that, at the time the first P2 signal occurs, a G1 signal occurs, and the first bar is printed by the print head 42. This is indicated in FIG. 7 by an X being in the column labeled G1 opposite the first P1 time. Also at this time, the latch circuit 108 is set to the "1" (high) state. Thereafter, the PA signal occurs, and the tag 32 advances two bar widths. An R1 signal then occurs and shifts the first data bit, which is a "0," to the input of the AND gate 88. The AND gate 88 is enabled on the next R2 signal, which is applied through the OR gate 90, and a "0" bit is applied to the modulo 3 counter 92. This causes the counter 92 to decrease its count by "one" or, in other words, to go from a count of "2" to a count of "1." On the next R3 signal, the count of "1" in the counter 92 is applied through the AND gates 96 and 98 and stored in the message register 100, and thus the MR=1 output of the MR decode circuit becomes high. On the R4 signal, a "1" bit is passed through the AND gate 116 and the OR gate 118 to the input of the shift register 120. Also, the second data bit, which is a "0" bit, is shifted out of the data register 82 to one input of the AND gate 88, and, on the R5 signal, this second bit is applied to the counter 92 to cause the count to go from a "1" to a "0." This causes the M3 decode circuit to have a high signal at its M3=0 output. Also on this R5 signal, the "1" bit applied to the shift register 120 is inserted in the first stage thereof. On the R6 signal, a "0" bit is applied at the output of the AND gate 114 and passes through the OR gate 118 to the input of the shift register 120, since the signal at the M3=1 output is then low. On the R7 signal, this "0" bit is shifted into the first stage, and the "1" bit previously in the first stage is shifted to the second stage. The R8 signal is then applied to the AND gate 112, and, since the latch circuit 108 had previously been set high at time P2 due to the first green bar being printed, the GA signal, which causes the green ribbon 54 to advance one step, is provided. On the next P1 signal, the latch circuit 108 is reset.

The second P2 signal will have no effect, since neither the M3=2 output is high nor the MR=2 output is high. Thus no green signals will be applied to the print heads 42 and 44. This is as desired, since the second and third color bars are respectively a black bar and a white bar. However, as noted above, the first bit applied into the shift register 120 was a "1," and this indicates that a black bar exists in the second space and this black bar will be printed when the second space is beneath the print head 46. Similarly, since the second bit applied to the shift register 120 was a "0," this represents the fact that there is no black bar in space three.

During the next sequence of clock 84 signals, the third and fourth binary bits, which are a "0" and a "0," respectively, are shifted through the AND gate 88 during the R2 and R5 time and cause the counter 92 to go first to the "2" count and thereafter back to the "1" count. During time R3, the message register 100 has a count of "2" locked therein, so the MR=2 signal became high at the output of the MR decode circuit 102. After the R5 signal, an M3=1 signal is high at the output of the M3 decode circuit 94. At time R8, the MR=2 high signal passes through the OR gate 110 and the AND gate 112, and the GA signal is provided to move the green ribbon one bar width. The P1 signal has no effect, since neither of the latch circuits 108 or 128 had previously been set. The P2 signal causes the G2 signal to appear at the output of the AND gate 106, since the MR=2 signal was high, thereby causing the print head 44 to print a green bar in the fourth space of the tag 32, then directly therebeneath. This print by the print head 44 was anticipated by the green ribbon advancing one bar width at the previous R8 signal.

This sequence of events continues for each of the binary bits. After the twentieth binary bit has been applied to the AND gate 88 at time R5, the first "1" bit, provided by the AND gate 116 at time R4 after bit 1 was read from the data register 82, will be appearing in the nineteenth stage of the shift register 120. At the next R7 signal, this "1" bit will be shifted into the twentieth stage of the shift register 120. At the next P2 signal, the AND gate 124 will apply the B1 signal, causing a black bar to be printed in the second space on the tag 32. Also, as seen at this time, M3=0 and MR=2 are high, so the G2 signal will also be provided by the AND gate 106, thereby causing a green bar to be printed in the 20th space.

At the next R5 signal, which is during the time binary bit 22 is being applied to the AND gate 88, this first "1" black data bit will be shifted to the 21st stage of the shift register 120, and the second "0" black data bit will be shifted into the 20th stage of the shift register 120. At time R7, the second "0" bit will go into the 21st stage, and the third "0" bit will go into the twentieth stage. As can be seen from FIG. 7 at the P2 signal time, just after the twenty-second bit has been shifted into the AND gate 88, M3=0 and MR=1 are high, and the twentieth and 21st stages of the shift register 120 will both have a "0" count. Thus, at this signal, none of the print heads will print signals. Similarly, at the next P2 signal times, the G2 and B2 signals are provided, causing a green bar in the 24th bar space and a black bar in the 25th space. This procedure continues until all of the green and black bars have been printed.

What is claimed is:

1. A printer which, in response to a given digital code, prints a given symbol having a given detectable characteristic in selected nonadjacent spaces of a movable surface, said surface being divided into a plurality of adjacent spaces, each of said spaces being capable of having a dimension of a given distance which is taken along a path parallel to the direction of movement of said surface, said printer comprising:

a first print head and a second print head, each print head carrying a print symbol with each of the symbols having the same dimensions, each print symbol having a width dimension taken along a path parallel to the direction of movement of said surface that is no greater than said given distance, said first and second print heads being substantially adjacent to each other and spaced apart less than said symbol width dimension, print head being associated with and including means responsive to a print signal applied thereto for causing the print head associated therewith to print said given symbol on said surface, said print heads being positioned with respect to each other so that, upon each occurrence of a print signal, each of said print heads is positioned to print in adjacent spaces on said surface;

surface moving means for causing said surface to move only and not less than a distance equal to an even-number multiple of said given distance between the time each of said print signals can occur; and logic means, capable of providing print signals after each surface moving means movement, and responsive to signals representative of said digital code, for providing a print signal to said first print head when-ever said first print head is to print said given symbol, and for providing a print signal to said second print head whenever said second print head is to print said given symbol.

2. The invention according to claim 1 wherein said printer further includes ribbon means including only a single ribbon positioned between both of said printing heads and said surface in such a manner that, upon the occurrence of any one print signal, the one print head having said one print signal applied thereto contacts said ribbon means and causes said ribbon means to contact said surface in one of said selected spaces, whereby said symbol is printed on said surface in said one selected space.

3. The invention according to claim 2 wherein said printer further includes ribbon-advancing means, responsive to the occurrence of a ribbon advance signal, for moving said ribbon by at least said given distance; and wherein said logic means includes means for providing said ribbon advance signal after the occurrence of each print signal which is applied to said first print head and before the occurrence of each print signal which is to be applied to said second print head.

4. The invention according to claim 3 wherein said ribbon-advancing means causes said ribbon to move in a direction from said first print head towards said second print head; and wherein said surface moving means causes said surface to move in a direction from said first print head towards said second print head.

5. The invention according to claim 1 wherein a sequence of second given symbols each having the same given second detectable characteristic is printed in second selected nonadjacent spaces of said surface;

wherein said printer further includes a third print head and a fourth print head, said third and fourth print heads being substantially adjacent to each other, each of said third and fourth print heads being associated with and including means responsive to a second print signal applied thereto for causing the print head associated therewith to print said second given symbol on said surface, said third and fourth print heads being positioned with respect to each other so that, upon each occurrence of a second print signal, each of said third and fourth print heads is positioned to print in adjacent spaces on said surface; and wherein said logic means further provides said second print signal to said third print head whenever said third print head is to print said second given symbol, and provides said second print signal to said fourth print head whenever said fourth print head is to print said second given symbol.

6. The invention according to claim 5 wherein said printer further includes first and second ribbon means, said first ribbon means including only one first ribbon positioned between both said first and second print heads and said surface in such a manner that, upon the occurrence of any one of said first-mentioned print signals, the one of said first and second print heads having said one first print signal applied thereto contacts said first ribbon and causes said first ribbon to contact said surface, whereby said first-mentioned symbol is printed on said surface in said one first selected space, and said second ribbon means including only one second ribbon positioned between both said third and fourth print heads and said surface in such a manner that, upon the occurrence of any one of said second print signals, the one of said third and fourth print heads having said one second print signal applied thereto contacts said second ribbon and causes said second ribbon to contact said surface, whereby said second symbol is printed on said surface in one of said second selected spaces.

7. The invention according to claim 6 wherein said printer further includes first and second ribbon advancing means, said first ribbon advancing means being responsive to the occurrence of a first ribbon advance signal for moving said first ribbon by at least said given distance, and said second ribbon advancing means being responsive to the occurrence of a second ribbon advance signal for moving said second ribbon to move by at least said given distance; and wherein said logic means includes means for providing said first ribbon advance signal after the occurrence of each first print signal that is applied to said first print head and before the occurrence of each first print signal that is applied to said second print head, and for providing said second ribbon advance signal after the occurrence of a second print signal that is applied to said third head and before the occurrence of a second print signal that is applied to said fourth head.

8. The invention according to claim 7 wherein said first ribbon advancing means causes said first ribbon to move in a direction from said first print head towards said second print head;

wherein said second ribbon advancing means causes said second ribbon to move in a direction from said third print head towards said fourth print head; and wherein said surface moving means causes said surface to move in a direction from said first print head towards said second print head, from said second print head towards said third print head, and from said third print head towards said fourth print head.

9. The invention according to claim 5 wherein said first and second print heads include means for printing said first given symbol as colored bars of a first color and said third and fourth print heads include means for printing said second given symbol as colored bars of a second color.

10. A printing system for causing a coded sequence of different color bars to exist in a certain area of a moving record medium in accordance with a given digital code, said certain area being divided into a plurality of adjacent integrally ordered segments, in each of which a bar is to exist, each segment having a dimension of a given distance which is taken along a path parallel to the direction of movement of said record medium, said bars being arranged in said segments so that first selected nonadjacent ones of said segments have bars of a first color therein, second selected nonadjacent ones of said segments have bars of a second color therein, and third selected nonadjacent ones of said segments have bars of a third color therein, said record medium moving in periodic discrete steps in a given direction, whereby said medium may be in either a stationary condition or a moving condition, the distance said medium moves during the moving condition of each discrete step being equal to the distance across any adjacent pair of said segments along a path parallel to said given direction, said printing system comprising:

a first and a second printing element, each associated with a respective one of a pair of adjacent segments on said medium during each stationary condition, each of said first and second printing elements including means responsive to the application thereto of selective first logic signals, which occur during a time when said medium is in a stationary condition, for causing a bar of said first color to be printed in the segment then associated with that printing element;

a third and fourth printing element, each associated with a respective one of a pair of adjacent segments on said medium during each stationary condition, each of said third and fourth printing elements including means responsive to the application thereto of selective second logic signals which occur during a time when said medium is in a stationary condition, for causing a bar of said second color to be printed in the segment then associated with said printing elements; each of said printing elements carrying a print bar with each of the bars having the same dimensions, each print bar having a width dimension taken along a path parallel to the direction of movement of said record medium that is equal to said given distance, logic means, responsive to said digital code, for selectively providing said first logic signal to said first printing element whenever a first selected segment is associated with said first printing element, for selectively providing said first logic signal to said second printing element whenever a first selected segment is associated with said second printing element, for selectively providing said second logic signal to said third printing element whenever a second selected segment is associated with said third printing element, and for selectively providing said second logic signal to said fourth printing element whenever a second selected segment is associated with said fourth printing element; and means for moving said record medium only and not less than a distance equal to an even-number multiple of said given distance.

11. The invention according to claim 10 wherein said third color is the color of said medium;

wherein said logic means applies no first logic signal to said first and second printing elements whenever the pair of adjacent segments then associated with said first and second printing elements during any given stationary condition of said medium are said second and said third selected segments; and wherein said logic means applies no second logic signal to said third and fourth printing elements whenever the pair of adjacent segments then associated with said third and fourth printing elements during any given stationary condition of said medium are said first and third selected segments.

12. The invention according to claim 11 wherein said printer further includes:

means, including only one first ribbon positioned between both said first and second printing elements and said medium in such a manner that, upon the occurrence of each first logic signal, the one of said first and second printing elements having said first logic signal applied thereto contacts said first ribbon and causes said first ribbon to contact said medium in the first selected segment then associated with that one of said first and second printing elements; and means, including only one second ribbon positioned between both said third and fourth printing elements and said medium in such a manner that, upon the occurrence of each second logic signal, the one of said third and fourth printing elements having said second logic signal applied thereto contacts said second ribbon and causes said second ribbon to contact said medium in the second selected segment then associated with that one of said third and fourth printing elements.

13. The invention according to claim 12:

wherein said printer further includes first ribbon-advancing means responsive to the occurrence of a first ribbon advance signal for moving said first ribbon in a first certain direction by at least the distance across any segment of said medium along a path parallel to said first certain direction, and second ribbon-advancing means responsive to the occurrence of a second ribbon advance signal for moving said second ribbon in a certain direction by at least the distance across any segment of said medium along a path parallel to said second certain direction; and wherein said logic means includes means for providing said first ribbon advance signal after the occurrence of each of said first logic signals applied to said first printing element and before the occurrence of each of said first logic signals applied to said second printing element, and for providing said second ribbon advance signal after the occurrence of each of said second logic signals applied to said third printing element and before the occurrence of each of said second logic signals applied to said fourth printing element.

14. The invention according to claim 13:

wherein said first ribbon-advancing means causes said first ribbon to move in a direction from said first printing element to said second printing element and said second ribbon-advancing means causes said second ribbon to move in a direction from said third printing element to said fourth printing element; and wherein said medium moves in a direction from said first and second printing elements to said third and fourth printing elements.

15. The invention according to claim 14 wherein said first and second printing elements are adjacent to one another, said third and fourth printing elements are adjacent to one another, and said second and third printing elements are separated from one another by a whole-number multiple of one half of the distance that said medium moves during the moving condition of each discrete step.

16. A method of printing symbols in non-adjacent given areas of a surface which is divided into a plurality of adjacent areas in response to a digital code, comprising the steps of: providing a pair of printing elements and a single inking ribbon for both of said printing elements, said ribbon being capable of being moved in a given direction, one of said printing elements being a leading printing element and the other of said printing elements being a trailing printing element relative to said given direction, each printing element carrying a print symbol, each print symbol having a width dimension no greater than the width of said given area taken along a path parallel to said given direction, moving said surface to a position such that a pair of adjacent areas of said surface is associated with said pair of printing elements;

determining from said digital code whether one area of said pair of adjacent areas is a given area;

causing the one of said printing elements associated with a given area to come in contact with the said single ribbon associated with both printing elements of said pair of printing elements to cause a symbol to be printed therein in the event one of said pair of adjacent areas is determined to be a given area; and moving said ribbon at least one but less than two print symbol widths after each time the said leading one of said pair of printing elements is caused to come in contact with said ribbon and moving said ribbon at least one but less than two print symbol widths prior to each time said trailing one of said pair of printing elements is caused to come in contact with said ribbon.

17. The method according to claim 16 wherein said surface and said ribbon both move in a direction from said leading to said trailing printing element.

18. The method according to claim 16:

wherein moving said surface occurs periodically and in discrete steps so that, after each movement, a new pair of adjacent areas become associated with said pair of printing elements in place of the previous pair of adjacent areas which were associated with said pair of printing elements, one of the areas of said new pair of adjacent and one of the areas of said previous pair of adjacent areas being adjacent and neither area of said new pair of adjacent areas being an area of said previous pair of adjacent areas;

wherein determining from said digital code whether one of the pair of adjacent areas is a given area occurs once for each movement; and wherein causing the one of said printing elements associated with a given area of said pair of adjacent areas to be operated to cause said symbol to be printed in said given area in the event one of said pair of adjacent areas is determined to be a given area occurs once for each movement.

19. The method according to claim 18 wherein said surface and said ribbon both move in a direction from said leading printing element to said trailing printing element.

20. A method by which four printing elements print a coded sequence of symbols in a given area of a moving record medium which is divided into a plurality of adjacent segments each segment having a dimension of a given distance which is taken along a path parallel to the direction of movement of said record medium, said symbols including a plurality of bars of first and second colors, said bars of said first color being printed in selected first ones of said segments and said bars of said second color being printed in selected second ones of said segments, said first and second selected segments being such that in any pair of adjacent segments, bars of different colors will be printed, the particular position of each of said first and second selected segments within said area of said medium being determined in accordance with a given digital code, said method comprising the steps of: providing first, second, third and fourth printing elements, each of said printing elements carrying a print bar with each of the bars having the same dimensions, each print bar having a width dimension taken along a path parallel to the direction of movement of said record medium that is equal to said given distance, moving said medium in periodic discrete steps only and not less than a distance equal to an even-number multiple of said given distance so that, after each movement, the first and second printing elements are associated with a different first pair of different adjacent segments, and the third and fourth printing elements are associated with a different second pair of different adjacent segments;

determining after each move from said digital code whether a first selected segment is one of the segments of the first pair of adjacent segments then associated with said first pair of printing elements and, in the event it is, with which one of said first and second printing elements it is associated, and whether a second selected segment is one of the segments of the second pair of adjacent segments then associated with said second pair of printing elements and, in the event it is, with which one of said third and fourth printing elements it is associated;

applying a first signal to the one of said first and second printing elements which is associated with a first selected segment in the event that a first selected segment is one of the segments in said first pair of segments, said first signal causing a bar of said first color to be printed in said first selected segment by the printing element to which said first signal is applied; and applying a second signal to the one of said third and fourth printing elements which is associated with a second selected segment in the event that a second selected segment is one of the segments in said second pair of segments, said second signal causing a bar of said second color to be printed in said second selected segment by the printing element to which said second signal is applied.

21. The method according to claim 22 further including the steps of:

moving a first ribbon associated with both said first and second printing elements after each application of said first signal to said first printing element and before each application of said first signal to said second printing element; and moving a second ribbon associated with both said third and fourth printing element after each application of said second signal to said third printing element and before each application of said second signal to said fourth printing element.

22. The method according to claim 23 wherein said medium moves in a direction from said first and second printing elements to said third and fourth printing elements.

23. The method according to claim 23 wherein said first ribbon moves in a direction from said first printing element to said second printing element and said second ribbon moves in a direction from said third printing element to said fourth printing element.

* * * * *

UNITED STATES PATENT OFFICE
CERTIFICATE OF CORRECTION

Patent No. 3,712,210 Dated January 23, 1973

Inventor(s) Donald E. Landis

It is certified that error appears in the above-identified patent and that said Letters Patent are hereby corrected as shown below:

Column 11, line 6, after "having" insert the following:
-- only one given symbol printed therein and each space having --.

Column 11, line 17, after "dimension," insert -- each --.

Signed and sealed this 2nd day of July 1974.

(SEAL)
Attest:

EDWARD M.FLETCHER,JR.
Attesting Officer

C. MARSHALL DANN
Commissioner of Patents